W. MURPHY.
ROAD-SCRAPER.
No. 187,547.   Patented Feb. 20, 1877.
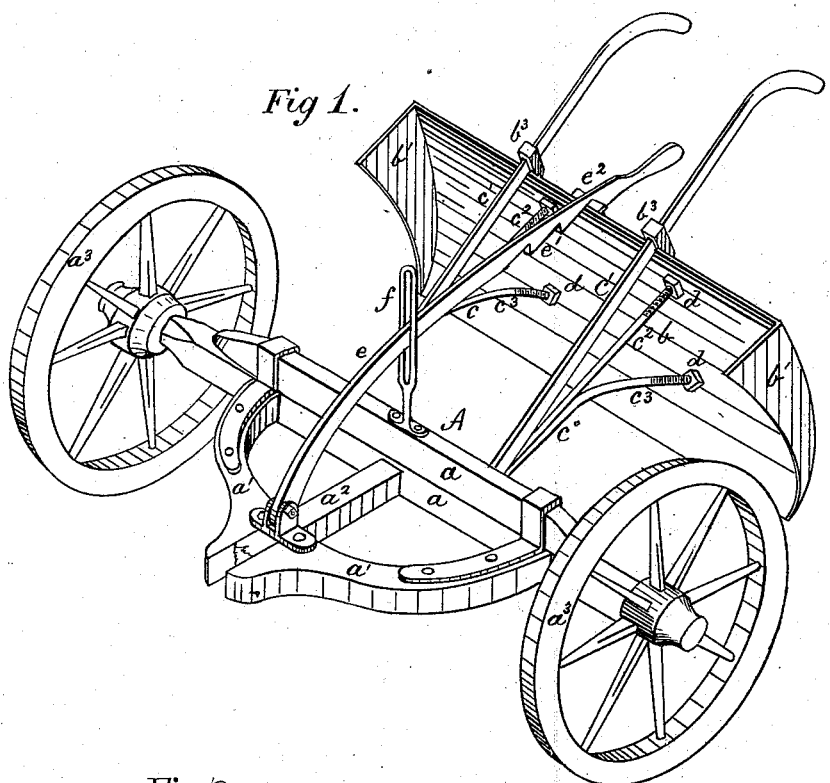
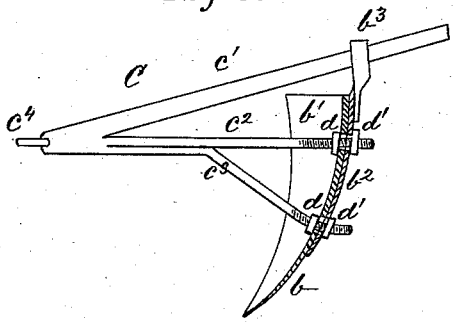
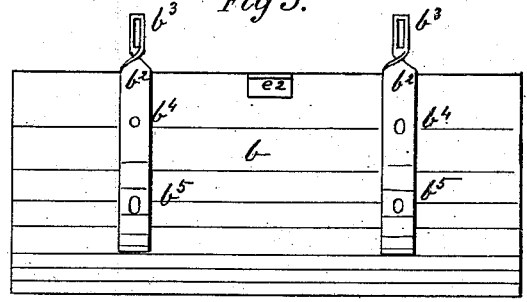
Witnesses.
B. C. Pole.
R. H. Lacey.
Inventor,
William Murphy
Per R. S. & A. P. Lacey,
Attorneys.

UNITED STATES PATENT OFFICE.

WILLIAM MURPHY, OF TOPEKA, KANSAS.

IMPROVEMENT IN ROAD-SCRAPERS.

Specification forming part of Letters Patent No. 187,547, dated February 20, 1877; application filed January 19, 1877.

*To all whom it may concern:*

Be it known that I, WILLIAM MURPHY, of Topeka, in the county of Shawnee and State of Kansas, have invented certain new and useful Improvements in Road-Scrapers; and I do hereby declare that the following is a full, clear, and exact description thereof, which will enable others skilled in the art to which it pertains to make and use the same, reference being had to the accompanying drawing, and to the letters of reference marked thereon, which form a part of this specification.

My invention relates to improvements in that class of road-scrapers mounted on axles and wheels. It consists in a frame hinged to the axle-tree, and adapted to receive and support the scraper, with capability of adjustment to any desired angle, and whereby said scraper may be raised when desired and automatically caught by a ratcheted lever-arm and held clear of the ground, as hereinafter more fully explained.

In the drawings, Figure 1 is a perspective view, showing the scraper, supporting-frames, and carriage; and Figs. 2 and 3 are detail views of the scraper and supporting-frame.

A is the carriage, composed of the axle $a$, hounds $a^1$, tongue $a^2$, and wheels $a^3$. $b$ is the scraper, made of steel, and curved and provided with the flanges $b^1$ $b^1$, and has secured to the back thereof the ribs or bars $b^2$ $b^2$, on the upper ends of which are formed the loops or eyes $b^3$ $b^3$, for the purpose hereinafter explained. It is pierced by the holes $b^4$ $b^4$, which may be slightly elongated, as shown, to permit a slight turning movement when adjusting it to different angles on the arms of the supporting-frame, hereinafter described. $c$ $c$ are the supporting-frames, each formed of the three arms $c^1$ $c^2$ $c^3$, rigidly united together at their front ends, and suitably connected with the axle $a$ by links $c^4$, so as to admit of a free vertical movement or raising of the scraper attached on the rear ends of said arms. The upper arm $c^1$ passes through, and fits loosely in, the eye $b^3$, and extends to the rear of and forms the handle by which the scraper may be raised or held down to the work, as desired.

The central arms $c^2$ are arranged so as to extend to the rear in the plane of the axle $a$, and in line of the draft or power which propels the carriage. They pass through, and fit loosely in, the upper holes $b^4$ in the scraper $c$.

The lower arms $c^3$ are inclined downward, and pass through the holes $b^5$ near the lower edge of the scraper $b$. They may be slightly circular in form, with the curve downward, if desired, so as to more readily admit of the setting forward or backward of the under part of the scraper when setting the latter at different angles.

The scraper is held rigidly on the frames $c$ by means of the inner and outer nuts $d$ $d'$, which are turned tight against the inner and outer faces thereof on the rods $c^2$ $c^3$, when it is set at the desired angle.

$e$ is a hinged lever, secured to the hounds $a^1$ in front of the axle $a$, and passes to the rear through the slotted guide $f$, and is provided with the teeth, and hooks $e^1$, adapted to catch on a flange or lip, $e^2$, on the upper edge of the scraper $b$. When disengaged from the scraper it is prevented from falling onto the axle by the guide $f$, which is so constructed as to support and hold it up out of the way of the scraper when the latter is at work, and in such position that it will automatically catch on the flange or lip $e^2$ when said scraper is raised clear of the ground.

The lever $e$ is secured to the hounds $a^1$ at a point far enough in front of the axle, so that when engaged, as shown in Fig. 1, there will be an equilibrium between the weight of the scraper and tongue, thus rendering it perfectly easy on the team in removing the device from place to place.

Having described my invention, what I claim, and desire to secure by Letters Patent, is—

1. The curved scraper $b$, constructed with the eyes or loops $b^3$ $b^3$ and holes $b^4$ $b^5$, and adapted to be placed on, and operated by, a triple-armed frame, $c$, with capability of adjustment at any desired angle, substantially as set forth.

2. The combination, with a carriage, A, and scraper $b$, hinged to the axle $a$, with capability of a vertical swinging movement, of a ratcheted lever, $e$, hinged to the hounds $a^1$ in front of the axle $a$, and arranged and adapted to automatically catch and hold the scraper $b$ clear of the ground, substantially as described.

In testimony that I claim the foregoing as my own I affix my signature in presence of two witnesses.

WILLIAM MURPHY.

Witnesses:
 WESLEY L. KNOX,
 JOHN D. KNOX.